United States Patent [19]

Anderlind et al.

[11] Patent Number: 4,790,967
[45] Date of Patent: Dec. 13, 1988

[54] METHOD AND APPARATUS FOR EXPANDING LOOSE FILL MATERIAL, SUCH AS EXPANDABLE POLYSTRENE PELLETS

[75] Inventors: Erik T. Anderlind, Riverside, Conn.; Jean-Pierre Guillemard, Saint Ouen, France

[73] Assignee: Compex Expanders S.A.R.L., Duclair, France

[21] Appl. No.: 907,096

[22] Filed: Sep. 12, 1986

[51] Int. Cl.$^4$ .................. C08J 9/22; F27B 15/08; F27B 15/09; F27B 15/14

[52] U.S. Cl. .................. 264/51; 264/DIG. 9; 425/4 C; 432/15; 432/58; 432/118

[58] Field of Search .................. 264/DIG. 9, 51, 53; 425/4 C; 432/15, 58, 118

[56] References Cited

U.S. PATENT DOCUMENTS

| | | | |
|---|---|---|---|
| 3,281,895 | 11/1966 | Holden et al. | 264/DIG. 9 |
| 3,386,716 | 6/1968 | Doyle et al. | 264/DIG. 9 |
| 3,598,769 | 8/1971 | Hanton | 264/DIG. 9 |
| 3,723,362 | 3/1973 | Battigelli | 264/DIG. 9 |
| 3,804,378 | 4/1974 | Walls et al. | 264/DIG. 9 |
| 3,821,342 | 6/1974 | Hurd | 264/DIG. 9 |
| 3,832,430 | 8/1974 | Noziere | 264/DIG. 9 |
| 4,379,106 | 4/1983 | Bussey, Jr. | 264/DIG. 9 |

FOREIGN PATENT DOCUMENTS

| | | | |
|---|---|---|---|
| 1074854 | 2/1960 | Fed. Rep. of Germany | 264/DIG. 9 |
| 47-27339 | 7/1972 | Japan | 264/DIG. 9 |

OTHER PUBLICATIONS

*The Plastics Institute Transactions and Journal*, vol. 29, No. 80, "New Developments in Cellular Plastics" by Cooper, Apr. 1961, pp. 48 and 49.

*Audels New Mechanical Dictionary for Technical Trades*, New York, Theo. Audel & Co., ©1962, p. 628.

*Hackh's Chemical Dictionary*, Fourth Edition, Completely Revised and Edited by Julius Grant, New York, McGraw-Hill Book Company, ©1972, p. 636.

*The Condensed Chemical Dictionary*, Tenth Edition, Revised by Gessner G. Hawley, New York, Van Nostrand Reinhold, ©1981, p. 968.

*Primary Examiner*—Philip Anderson
*Attorney, Agent, or Firm*—Fitzpatrick, Cella, Harper & Scinto

[57] ABSTRACT

A compact, self-contained apparatus and method for expanding loose fill foam material for packaging includes an eductor having a fan, a venturi chamber, and a wire mesh cage arrangement for automatically feeding expandable loose fill material to a hopper. The loose fill material is then uniformly fed through the hopper by air pressure in conjunction with gravity to an expansion chamber. The expansion chamber includes a stepped conveyance platform disposed over a stepped steam chamber, and a track arrangement for simultaneously conveying and tumbling the loose fill material across each conveyance platform step. A condensing unit disposed above the expansion chamber removes excess moisture from the expansion chamber and provides warm dry air to a discharge housing from which the expanded loose fill material is discharged from the expansion chamber.

40 Claims, 1 Drawing Sheet

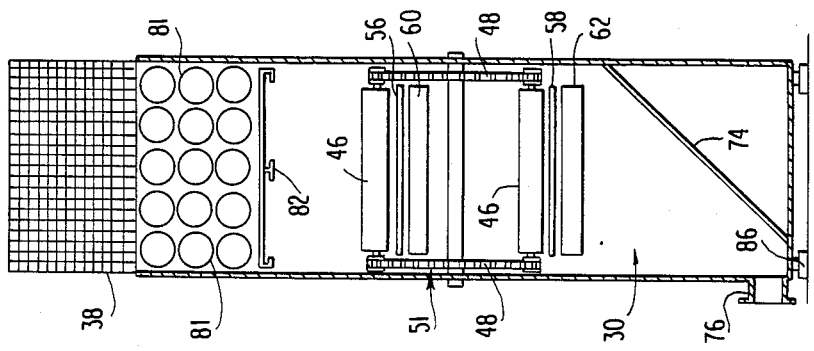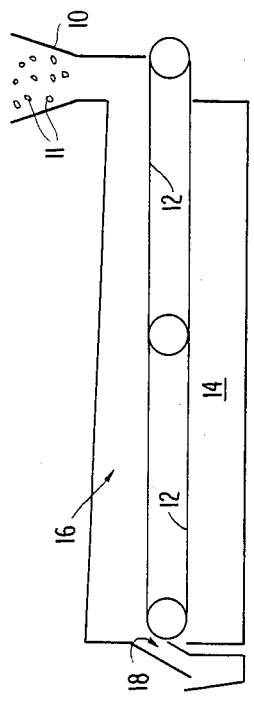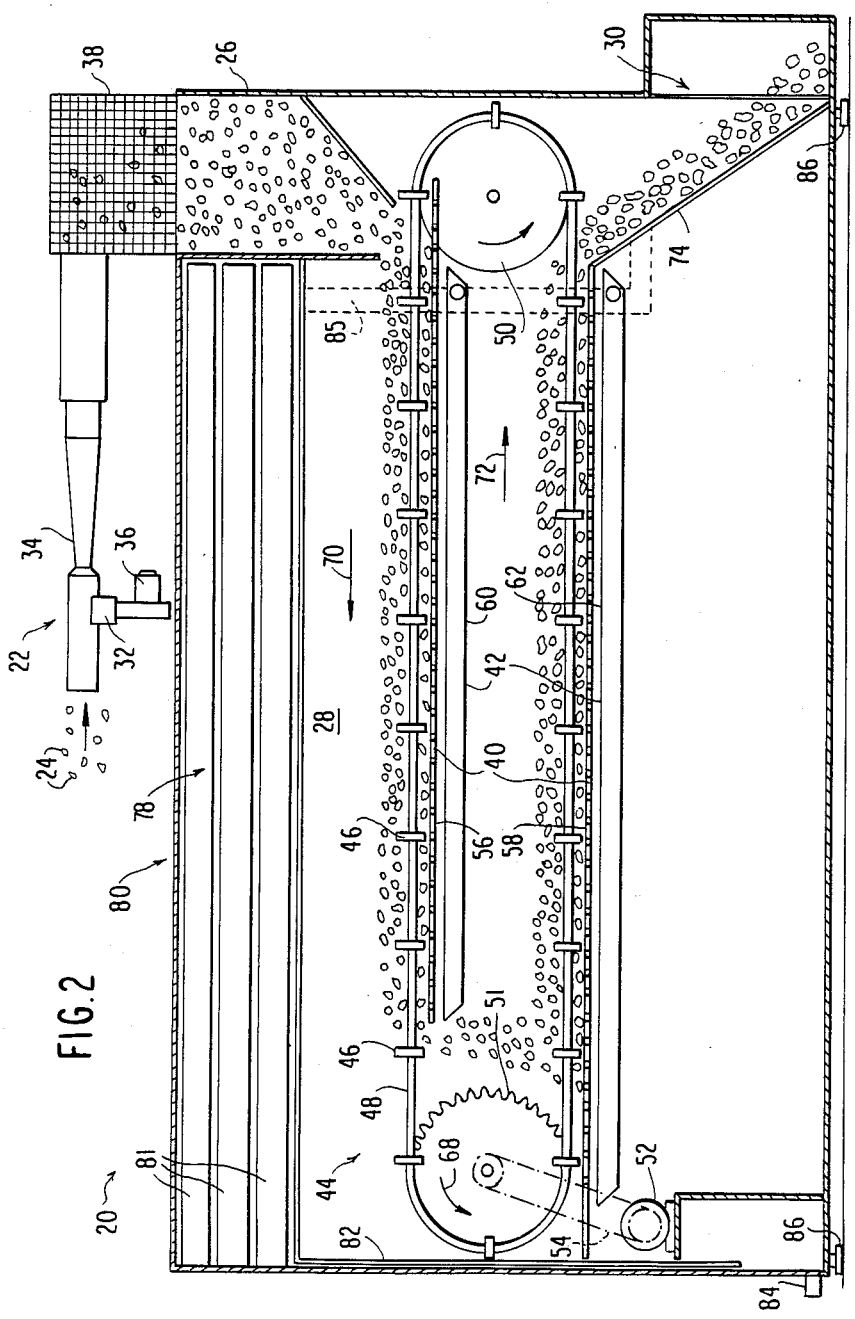

METHOD AND APPARATUS FOR EXPANDING LOOSE FILL MATERIAL, SUCH AS EXPANDABLE POLYSTRENE PELLETS

BACKGROUND OF THE INVENTION

1. Field of the Invention

The present invention relates generally to a system for preparing packaging material, and particularly to a compact, self-contained apparatus and method for expanding loose fill material, such as polystyrene pellets, for packaging such articles.

2. Description of the Prior Art

It is well known in the art to use expanded polystyrene pellets as packaging materials for void fill applications and for shipping fragile, oddly shaped or mixed lots of products. In such a packaging system, small dense polystyrene pellets are expanded, much like popcorn, to form large fluffy, loose fill foam material about one hundred times the original size. Such expanded polystyrene loose fill foam may be used to pack substantially any article and protects virtually everything it surrounds.

Polystyrene loose fill packaging provides numerous advantages. For example, the low weight to volume ratio of the material polystyrene provides substantial savings in packed product transportation and shipping costs. The polystyrene pellets neither absorb moisture from the air nor lose their protective qualities when wet, and the snow-white color and resilient surface keep goods clean and scratch free. Further, a polystyrene loose fill packaging system does not produce dust, chips, static electricity, or waste and, since the polystyrene loose fill is stored in overhead hoppers and is gravity fed into shipping cartons, such a system provides substantial savings in packaging time and labor costs.

One alternative to the present system is to purchase expanded, ready-to-use, loose fill material. However, as ready-to-use loose fill is expanded to about 100 times its original size, a substantial portion of the end user cost is then related to the transportation and handling of "air".

For the above reasons, interest in developing a simple, compact, self-contained apparatus for expanding polystyrene loose fill material at the packaging site has recently increased. Typically polystyrene pellets are initially subjected to a preexpansion operation bringing them to a partially expanded state. These partially expanded pellets are then subjected to multiple additional expansions to bring them to their fully expanded state. FIG. 1 illustrates one device which has resulted from this development for performing the multiple subsequent expansions. The device generally comprises a hopper 10 for gravity feeding expandable loose fill material 11 to a cloth-type conveyor belt 12. The belt, e.g. a polyethylene mesh belt, is disposed over steam distributing means 14 and conveys the expandable loose fill material 11 through a steam filled expansion chamber 16 to a discharge chute 18.

While the conveyor belt-type device of the prior art has great utility in many applications, further improvements may still be made to it. The cloth-like conveyor belt of the prior art has particular utility in that the steam released below the conveyor belt may penetrate therethrough by convection. In this manner, the pile of loose fill material conveyed thereacross may be exposed to steam from all sides, facilitating uniform expansion thereof. However, the close weave of cloth-like materials generally traps a portion of the moisture in the steam as it penetrates therethrough, thus restricting the flow of the steam, reducing the exposure of the loose fill material to the steam, and tending to deteriorate the cloth-like material.

In addition, because the loose fill material is gravity fed from the hopper to the conveyor belt, and thereafter remains generally stationary relative to the cloth-like conveyor belt, it tends to form in uneven piles. As the loose fill material expands, these piles often trap a portion of the moisture from the steam and clump together. This causes non-uniform exposure of the loose fill material to the steam, and consequent non-uniform expansion thereof.

Further, due to the fact that the steam rises through the apparatus by convection, and the light-weight loose fill material is gravity fed from a hopper, the steam also tends to force the loose fill material to back up into the hopper, causing clogging.

Finally, because the loose fill material is expelled while still hot and moist from the steam in the expansion chamber, the expanded loose fill material tends at least partially to reshrink.

SUMMARY OF THE INVENTION

Accordingly, it is an object of the present invention to provide a self-contained, compact, loose fill material expander that is an improvement over loose fill material expanders known in the prior art.

More particularly, it is an object of the present invention to provide an a low maintenance, improved expander of the class described that efficiently produces uniformly expanded loose fill material.

It is another object of the present invention to provide a self-contained, compact, loose fill material expander that has automatic feed capabilities which resist clogging.

It is yet another object of the present invention to provide a self-contained, compact, loose fill material expander that prevents clumping of the loose fill material during expansion.

It is a further object of the present invention to provide a self-contained, compact, loose fill material expander that substantially reduces moisture accumulation on the loose fill material during expansion while also preventing post-expansion shrinkage of the loose fill material due to moisture accumulation on the material during expansion, and rapid cooling thereafter.

The present invention also provides a method for expanding loose fill material using a device having the attributes mentioned above.

In accordance with a preferred embodiment, the present invention resides in apparatus for expanding loose fill material, such as polystyrene foam pellets, that have been preexpanded at least once as described above. This apparatus comprises an inductor, having a fan, a venturi chamber, and a mesh cage arrangement for automatically feeding the loose fill material into a hopper. The loose fill material is then automatically fed through the hopper by air pressure in conjunction with gravity to a stepped, foraminous conveyance platform. The material is conveyed and tumbled across the stepped platform, through an expansion chamber formed between a steam generator and a condensor, by a track arrangement having at least one tumbling bar advanced by at least one continuous loop chain. The expanded loose fill material is then fed to a discharge housing within which the cooling rate of the material is reduced by dry warm air supplied to the housing from the condensor by a conduit manifold system.

The present invention also includes a method for producing expanded polystyrene loose fill foam including the steps of inducting polystyrene loose fill pellets into a hopper by means of an automatic feeding arrangement having a fan, a venturi chamber and a wire mesh cage, conveying and tumbling the loose fill material across a stepped, foraminous conveyance platform by means of a track arrangement including at least one tumbling bar affixed to at least one continuous loop chain, steam-treating the conveyed and tumbled loose fill material, and drying the steam-expanded loose fill material with warm dry air.

A more complete appreciation of the present invention and a more complete and thorough understanding of these and other objects, aspects and features of the present invention will be provided in the following detailed description when considered in conjunction with the accompanying drawing.

BRIEF DESCRIPTION OF THE DRAWING

FIG. 1 is a side view, partly broken away to illustrate internal structure, of a prior art apparatus for expanding polystyrene loose fill material.

FIG. 2 is a side view, partly broken away to illustrate internal structure, of an apparatus for expanding polystyrene loose fill material in accordance with a preferred embodiment of the present invention; and FIG. 3 is an end view, partly broken away to illustrate internal structure, of the expander of FIG. 2.

DESCRIPTION OF THE PREFERRED EMBODIMENTS

The present invention is directed to an apparatus and method for expanding loose fill foam for packaging, and is particularly directed to an apparatus and method for expanding a number of additional times polystyrene loose fill pellets that have been preexpanded at least once from their totally unexpanding condition. However, this invention may be used with advantage in conjunction with other materials which are treated with steam.

Referring now to FIG. 2, an apparatus in accordance with a preferred embodiment of the present invention for expanding a number of additional times polystyrene loose fill material is illustrated generally at 20. The apparatus includes an inductor 22 for automatically feeding preexpanded loose fill material 24 to a hopper 26, an expansion chamber 28 through which the loose fill material is conveyed and tumbled in steam, and a discharge housing 30 for discharging the expanded loose fill material 24 from the apparatus The inductor 22 includes a fan 32 and venturi chamber 34 arranged automatically to feed expandable loose fill material 24 into the hopper 26. The fan 32 may be driven by conventional means, shown here as a variable speed motor 36. It will be appreciated that by varying the speed of the electric motor 36, an operator can control the automatic feed rate of the apparatus 20 which before any expansion is typically of a density of the order of 0.70 to 0.90 lbs/cft.

As shown in FIGS. 2 and 3, the loose fill material 24 is fed into the hopper 26 through a mesh cage 38. The cage 38 is generally open-bottomed and is disposed above the hopper 26 so that the loose fill material 24 may flow freely from the cage 38 to the hopper 26.

It will be appreciated that the loose fill material 24 is thus automatically fed to the hopper 26 by means of the forces generated by the inductor 22 and by gravity. The open structure of the mesh cage 38 effectively channels the force of the preexpanded material-air mixture from the inductor 22 into the hopper 26, yet dissipates excessive pressure and air through the foraminous enclosure. This action, in conjunction with gravity, packs the loose fill material 24 into the hopper 26 with sufficient downward force to prevent the material 24 from being "blown-back" up in the hopper 26 by steam within the expansion chamber 28, excess air being vented through the mesh cage.

The mesh cage 38 may be composed of any conventional material which can withstand the force of the preexpanded material-air mixture. However, the preferred material is a wire mesh most preferably formed of stainless steel or aluminum. These materials provide a strong, durable, corrosion resistant cage which reguires minimal maintenance.

The expandable loose fill material 24 is fed from the hopper 26 to an expansion chamber 28. The bottom of the hopper 26 is preferably tapered and truncated to maintain a continuous even flow of the loose fill material 24 into the expansion chamber 28.

The expansion chamber 28 includes a stepped conveyance platform 40, stepped steam distribution chambers 42, and a track arrangement 44 including a plurality of tumbling bars 46 affixed to a pair of continuous loop chains 48. The chains 48 are rotated around a pair of pulley gears 50, 51, driven by a second variable speed motor 52 and drive chain 54.

The conveyance platform 40 includes a first or top step 56 extending from a position between the hopper 26 and pulley gear 50, through the expansion chamber 28, to a position proximate the top of pulley gear 51. A second or bottom step 58 extends from a position below pulley gear 51, back through the expansion chamber 28, to a position proximate the bottom of pulley gear 50.

The conveyance platform 40 of the preferred embodiment is a foraminous platform such as a perforated metal sheet, the openings of which constitute of the order of 70% of the surface area. The most preferred materials are perforated stainless steel and aluminum metal sheets. As will be discussed in greater detail below, these perforated sheets provide enhanced circulation of steam within the expansion chamber 28. Further, these materials provide a strong, durable corrosion resistant platform which requires minimal maintenance.

Disposed below the steps 56, 58 of the conveyance platform 40 are respective steam distribution chambers 60, 62 which, together with the platform 40, extend laterally across the chamber 28 substantially the full distance between the chains 48. These steam distribution chambers 60, 62 receive steam from a steam generator (not shown) and evenly distribute it below each conveyance platform step 56, 58. While "steam" is mentioned, steam or hot water vapor may be used in the subject invention. In the preferred embodiment, loose fill is expanded in hot water vapor at about 212° F. and about 100% relative humidity at an ambient or low pressure. Therefore, as used herein, the term "steam" is to be understood to include both hot water vapor and steam, whether pressurized or not.

The track arrangement 44 is disposed so that the continuous loop chains 48 advance the tumbling bars 46 across both steps of the conveyance platform 40. The tumbling bars 46 may be affixed to the chains 48 by conventional means such as hooks and screws (not shown). As shown in FIG. 2, the second variable speed motor 52, through drive chain 54 drives pulley gear 51 in the counter-clockwise direction shown by arrow 68. The chains 48 are thereby rotated in a counter-clockwise direction around the pulley gears 50,51. The tumbling bars 46 are thus advanced to the left across the first step 56 (as shown by arrow 70), and to the right across the second step 58 (as shown by arrow 72). As will be discussed in greater detail below, the loose fill material 24 is thus conveyed and tumbled across the stepped conveyance platform 40.

In the preferred embodiment, the tumbling bars 46 are rectangular, and are composed of a sturdy, durable, noncorrosive material which slides easily across the surface of the conveyance platform 40. The preferred material is a high density polyethylene.

The continuous loop chains of the preferred embodiment are also composed of a strong, durable, noncorrosive material, such as stainless steel, to minimize maintenance.

The discharge housing 30 includes a discharge chute 74 formed between the end of the second conveyance platform 58, and a discharge port 76. The discharge chute 74 may also be formed of a conventional sheet material, preferrably stainless steel or aluminum sheeting. The discharge port 76 may further be arranged in fluid communication with an eductor (not shown) for educting expanded loose fill material 24 from the expander apparatus 20 to storage hoppers (also not shown) or to be returned for further expansion to the inductor 22 for repeated circulation through the device.

The preferred embodiment of the present invention further includes a condensing unit 78 including a conduit manifold arrangement 80 including a number of pipes 81, and condensate collectors 82. As shown in FIG. 3, the conduit manifold arrangement 80 is disposed above the expansion chamber 28. It takes in cool dry air from ambient through the end of the pipes 81 opposite the cage 26 and passes it through the pipes 81 of the conduit manifold arrangement 80, so that the steam heats the cool dry air and is itself cooled and condenses in the condensating unit 78. The conduit manifold arrangement 80 then exhausts the warm dry air which is at about 120° F. to about 140° F. through a conduit 85 to the discharge housing 30, so that the expanded loose fill material avoids thermal shock, cools in a dry atmosphere, and is cured relatively quickly, thus reducing reshrinkage. The condensate collector 82 is disposed beneath the conduit manifold arrangement 80, collects condensation formed thereby, and channels the condensate to a drain 84 disposed at the base of the expander apparatus 20.

The expander apparatus 20 of the preferred embodiment is supported by adjustable feet 86. The height of the feet 86 may be adjusted to maintain the condensate collectors 82, and all other surfaces in the expansion chamber 28, at a slight incline, e.g. a 5° incline, such that gravity facilitates the channeling of the condensate away from the expansion chamber 28 to the drain 84.

It will be appreciated that the above described and other features of the present invention provide a method for uniformly distributing steam within the expansion chamber 28, uniformly exposing the loose fill material 24 to the steam, and uniformly expanding the loose fill material 24. As described above, the loose fill material 24 is first uniformly fed from the inductor 22 to the conveyance platform 40 through hopper 26. The disposition of each steam distribution chamber step 60, 62 below each respective conveyance platform step 56,58 initiates the even flow of steam to the loose fill material 24 supported thereon. The foraminous structure of the conveyance platform 40 allows the steam to rise generally unobstructed and uniformly by convection to the loose fill material 24 while the tumbling bars 46 tumble the loose fill material 24 as it is advanced across the conveyance platform 40. In this manner, the loose fill material is simultaneously conveyed and tumbled, facilitating uniform distribution of the steam through the loose fill material 24 and preventing clumping thereof. The stepped arrangement of the conveyance platform 40 further facilitates the uniform exposure of the loose fill material 24 to steam and further prevents clumping by tumbling the loose fill material 24 in free-fall from one step to the next. The condensing unit 78 also facilitates uniform loose fill material exposure and expansion by removing condensation from the expansion chamber 28, thus preventing clumping due to excessive moisture accumulation on the material 24.

While specific embodiments of the present invention have been described above in detail, it will be appreciated that this description is for purposes of illustration. Modifications may be made to the described embodiments of the loose fill material expander and the method for using it in order to adapt it to particular applications without departing from the scope of the following claims.

What is claimed is:

1. A method for expanding loose fill material comprising the steps of:
    providing hopper means for receiving and storing loose fill material to be expanded;
    providing an expansion chamber having a platform disposed therein for receiving loose fill material from said hooper means;
    conveying and simultaneously tumbling loose fill material across said platform;
    generating steam; and
    distributed generated steam through said platform to expand said loose fill material as it is simultaneously conveyed and tumbled across said platform, said steam being substantially uniformly exposed to said loose fill material as a result of said simultaneous conveying and tumbling.

2. Apparatus for expanding loose fill material, comprising:
    hopper means for receiving and storing the loose fill material to be expanded;
    an expansion chamber;
    perforated platform means mounted within said expansion chamber for receiving said loose fill material to be expanded from said hopper means;
    track means for conveying said loose fill material received from said hopper means across said platform means and for simultaneously tumbling said loose fill material on said platform means;
    means for generating steam; and
    means for distributing steam generated by said generating means through said platform means to expand said loose fill material conveyed across and tumbled on said platform means by said track means.

3. Apparatus according to claim 2, further comprising:
    automatic feed means for inducting loose fill material to said hopper means.

4. Apparatus according to claim 3, wherein said automatic feed means comprises:
fan means; and
venturi chamber means in fluid communication with said fan means for inducting loose fill material to said hopper means.

5. Apparatus according to claim 4, wherein said apparatus further comprises:
a mesh cage having an opening for receiving loose fill material from said venturi chamber means and an opening for supplying said loose fill material to said hopper means.

6. Apparatus according to claim 5, wherein said cage is a wire mesh cage.

7. Apparatus according to claim 6, wherein said wire mesh cage is stainless steel.

8. Apparatus according to claim 5, wherein said cage is disposed above said hopper means and in fluid communication therewith, and wherein said loose fill material is pressed down into said hopper by gravity in combination with forces generated by said automatic feeding means.

9. Apparatus according to claim 8, wherein the lower opening of said hopper is at least partially defined by a tapered element.

10. Apparatus for expanding loose fill material, comprising:
hopper means for receiving and storing the loose fill material to be expanded;
an expansion chamber;
a platform disposed within said expansion chamber for receiving said loose fill material to be expanded from said hopper means, said platform being permeable to steam;
conveying and tumbling means for simultaneously conveying said loose fill material across said platform and tumbling said loose fill material thereon;
means for generating steam; and
means for distributing steam generated by said generating means through said platform to expand said loose fill material conveyed across and tumbled on said platform by said conveying and tumbling means; wherein said loose fill material thereby is exposed on said platform to the stream from said steam distributing means in a substantially uniform manner as a result of being conveyed across and tumbled on said platform by said conveyed and tumbling means.

11. Apparatus according to claim 10, wherein said platform is a foraminous sheet.

12. Apparatus according to claim 11, wherein said foraminous metal sheet is stainless steel.

13. Apparatus according to claim 11, wherein said foraminous metal sheet is aluminum.

14. Apparatus according to claim 11, wherein the openings in said foraminous sheet constitute of the order of 70% of its surface area.

15. Apparatus according to claim 10, wherein said platform is stepped, and wherein said loose fill material is first conveyed and tumbled across a first step of said platform, then tumbled in free fall by gravity to a second step of said platform, and then conveyed and tumbled across said second step.

16. Apparatus according to claim 10, wherein said conveying and tumbling means comprises:
at least one tumbling bar; and
chain means affixed to said at least one tumbling bar, for advancing said at least one tumbling bar across said platform in the direction in which said loose fill material is to be conveyed, thus to convey said loose fill material across said platform and to simultaneously tumble said loose fill material thereby.

17. Apparatus according to claim 16, wherein said at least one tumbling bar is composed of polyethylene.

18. Apparatus according to claim 17, wherein said at least one tumbling bar is rectangular.

19. Apparatus according to claim 16, wherein said chain means comprises:
at least one chain arranged to form a continuous loop;
pulley means, disposed fore and aft of said platform, for advancing said continuous loop chain across said platform; and
means for driving said pulley means.

20. Apparatus according to claim 19, wherein said platform is stepped, and wherein said loose fill material is first conveyed and tumbled across a first step of said platform by said at least one tumbling bar affixed to said continuous loop chain means, then tumbled in free-fall by gravity to a second step of said platform, and then conveyed and tumbled across said second step by said at least one tumbling bar affixed to said continuous loop chain means.

21. Apparatus according to claim 1, further comprising:
condensing means, disposed above said track means for condensing the steam from said steam generating means after it has passed through said loose fill material, wherein said loose fill material remains substantially dry.

22. Apparatus according to claim 21, wherein said condensing means further comprises:
condensate collecting means, disposed below said condensing means, for collecting condensate generated by said condensing means and for channelling said condensate away from said loose fill material being conveyed on said platform means.

23. Apparatus according to claim 21, wherein said condensing means further comprises:
conduit manifold means for drawing cool dry air from ambient into said condensing means and expelling warm dry air therefrom.

24. Apparatus according to claim 23, further comprising:
a discharge housing, disposed in communication with said track means, for receiving expanded loose fill material therefrom, and for educting expanded loose fill material from the apparatus.

25. Apparatus according to claim 24, wherein said conduit manifold is in fluid communication with said discharge housing and discharges substantially dry warm air from said condensing means into said housing.

26. Apparatus according to claim 1, further comprising:
a discharge housing, disposed in communication with said track means, for receiving expanded loose fill material therefrom, and for educting expanded loose fill material from the apparatus.

27. Apparatus for expanding loose fill material; comprising:
automatic feed means having a fan and venturi chamber arrangement for inducting loose fill material;
hopper means for receiving and storing loose fill material from said automatic feed means;
means for receiving said loose fill material from said hopper means;

steam distribution means for distributing steam to loose fill material received by said receiving means thereby for expanding said loose fill material; and an open mesh cage having an upper opening for receiving loose fill material from said automatic feed means and a lower opening for supplying said loose fill material to said hopper means, said mesh cage channeling force to inducted loose fill material from said automatic feed means to said hopper means and dissipating excessive pressure through the open mesh thereof.

28. Apparatus according to claim 27, wherein said cage is stainless steel wire mesh.

29. Appartus for expanding loose fill material, comprising:
hopper means for receiving and storing the loose fill material to be expanded;
an expansion chamber;
a platform disposed within said expansion chamber for receiving said loose fill material to be expanded from said hopper means, being permeable to steam, said platform being stepped having first and second steps;
conveying and tumbling means for simultaneously conveying said loose fill material across said first step of said platform and tumbling said loose fill material thereon, for tumbling said loose fill material in free fall by gravity to said second step of said platform, and for simultaneously conveying said loose fill material across said second step of said platform and tumbling said loose fill material thereon;
means for generating steam; and
means for distributing steam generated by said generating means through said platform to expand said loose fill material conveyed across and tumbled on said platform by said conveying and tumbling means, wherein said loose fill material thereby is exposed on said platform to the steam from said steam distributing means in a substantially uniform manner as a result of being conveyed across and tumbled on said platform by said conveying and tumbling means.

30. Apparatus for expanding loose fill material, comprising:
hopper means for receiving and storing the loose fill material to be expanded;
an expansion chamber;
a platform disposed within said expansion chamber for receiving said loose fill material to be expanded from said hooper means, said platform being permeable to steam;
conveying and tumbling means for simultaneously conveying said loose fill material across said platform and tumbling said loose fill material thereon, said conveying and tumbling means including at least one tumbling bar, and chain means affixed to said at least one tumbling bar for advancing said at least one tumbling bar across said platform in the direction in which said loose fill material is to be conveyed, thus to convey said loose fill material across said platform and to simultaneously tumble said loose fill material thereby;
means for generating steam; and
means for distributing steam generated by said generating means through said platform to expand said loose fill material conveyed across and tumbled on said platform by said conveying and tumbling means, wherein said loose fill material thereby is exposed on said platform to the steam from said steam distributing means in a substantially uniform manner as a result of being conveyed across and tumbled on said platform by said conveying and tumbling means.

31. Apparatus according to claim 30, wherein said at least one tumbling bar is composed of polyethylene.

32. Apparatus accoridng to claim 31, wherein said at least one tumbling bar is rectangular.

33. Apparatus according to claim 30, wherein said chain means comprises:
at least one chain arranged to form a continuous loop;
pulley means, disposed fore and aft of said platform, for advancing said continuous loop chain across said platform; and
means for driving said pulley means.

34. Apparatus according ot claim 33, wherein said platform is stepped, and wherein said loose fill material is first conveyed and tumbled across a first step of said platform by said at least one tumbling bar affixed to said continuous loop chain means, then tumbled in free-fall by gravity to a second step of said platform, and then conveyed and tumbled across said second step by said at least one tumbling bar affixed to said continuous loop chain means.

35. Apparatus for expanding loose fill material, comprising:
hopper means for receiving and storing the loose fill material to be expanded;
an expansion chamber;
perforated platform means mounted within said expansion chamber for receiving said loose fill material to be expanded from said hopper means;
track means for conveying said loose fill material received from said hopper means across said platform means and for simultaneously tumbling said loose fill material on said platform means;
means for generating steam;
means for distributing steam generated by said generating means through said platform means to expand said loose fill material conveyed across and tumbled on said platform means by said track means; and
condensing means disposed above said track means for condensing the steam from said steam generating means after it has passed through said loose fill material, wherein said loose fill material remains substantially dry.

36. Apparatus according to claim 35, wherein said condensing means further comprises:
condensate collecting means, disposed below said condensing means, for collecting condensate generated by said condensing means and for channelling said condensate away from said loose fill material being conveyed on said platform means.

37. Apparatus according to claim 35, wherein said condensing means further comprises:
conduit manifold means for drawing cool dry air from ambient into said condensing means and expelling warm dry air therefrom.

38. Apparatus according to claim 37, further comprising:
a discharge housing, disposed in communication with said track means, for receiving expanded loose fill material therefrom, and for educting expanded loose fill material from the apparatus.

39. Apparatus according to claim 38, wherein said conduit manifold is in fluid communication with said discharge housing and discharges substantially dry warm air from said condensing means into said housing.

40. Apparatus according to claim 35, further comprising:
a discharge housing, disposed in communication with said track means, for receiving expanded loose fill material therefron, and for educting expanded loose fill material from the apparatus.

* * * * *

UNITED STATES PATENT AND TRADEMARK OFFICE
CERTIFICATE OF CORRECTION

PATENT NO. : 4,790,967
DATED : December 13, 1988
INVENTOR(S) : ERIK T. ANDERLIND ET AL.   Page 1 of 2

It is certified that error appears in the above-identified patent and that said Letters Patent is hereby corrected as shown below:

AT [54] TITLE

"POLYSTRENE" should read --POLYSTYRENE--.

COLUMN 1

Line 4, "POLYSTRENE" should read --POLYSTYRENE--.

COLUMN 2

Line 30, "an" should be deleted.

COLUMN 4

Line 19, "reguires" should read --requires--.

COLUMN 5

Line 26, "preferrably" should read --preferably--.

COLUMN 6

Line 41, "distributed" should read --distributing--.

COLUMN 7

Line 47, "conveyed" should read --conveying--.
Line 56, "of" should read --on--.

COLUMN 8

Line 61, "material;" should read --material,--.

UNITED STATES PATENT AND TRADEMARK OFFICE
CERTIFICATE OF CORRECTION

PATENT NO. : 4,790,967

DATED : December 13, 1988

INVENTOR(S) : ERIK T. ANDERLIND ET AL.   Page 2 of 2

It is certified that error appears in the above-identified patent and that said Letters Patent is hereby corrected as shown below:

COLUMN 9

Line 8, "to" should read --of--.
    Line 14, "Appartus" should read --Apparatus--.

COLUMN 10

Line 9, "accoridng" should read --according--.
    Line 18, "ot" should read --to--.

COLUMN 12

Line 5, "therefron," should read --therefrom,--.

Signed and Sealed this

Twelfth Day of December, 1989

Attest:

JEFFREY M. SAMUELS

*Attesting Officer*    *Acting Commissioner of Patents and Trademarks*